(12) United States Patent
Benkert et al.

(10) Patent No.: US 9,096,332 B2
(45) Date of Patent: Aug. 4, 2015

(54) AIRSHIP DOCKING STATION

(71) Applicant: Raytheon Company, Waltham, MA (US)

(72) Inventors: John G. Benkert, Acton, MA (US); Frank A. Birdsong, Alexandria, VA (US)

(73) Assignee: Raytheon Company, Waltham, MA (US)

( * ) Notice: Subject to any disclaimer, the term of this patent is extended or adjusted under 35 U.S.C. 154(b) by 218 days.

(21) Appl. No.: 13/924,150

(22) Filed: Jun. 21, 2013

(65) Prior Publication Data

US 2013/0341463 A1    Dec. 26, 2013

Related U.S. Application Data

(60) Provisional application No. 61/662,472, filed on Jun. 21, 2012.

(51) Int. Cl.
*B64F 1/12* (2006.01)
*B64F 1/14* (2006.01)

(52) U.S. Cl.
CPC .... *B64F 1/12* (2013.01); *B64F 1/14* (2013.01)

(58) Field of Classification Search
CPC ........................................................ B64F 1/12
USPC ...................................... 244/114 R, 115, 116
See application file for complete search history.

(56) References Cited

U.S. PATENT DOCUMENTS

| | | | | |
|---|---|---|---|---|
| 7,275,714 | B2 * | 10/2007 | McNabb et al. | 244/115 |
| 8,070,096 | B2 * | 12/2011 | Wood et al. | 244/116 |
| 8,092,166 | B2 | 1/2012 | Nicolas et al. | |

\* cited by examiner

*Primary Examiner* — Christopher P Ellis
*Assistant Examiner* — Richard G Davis
(74) *Attorney, Agent, or Firm* — Renner, Otto, Boisselle & Sklar, LLP

(57) ABSTRACT

An airship docking station includes one or more sources of relatively high speed airflow to facilitate landing an airship in turbulent or gusting air conditions. The sources of airflow are arranged to produce an envelope of airflow over the surface of the airship to stabilize the airship as it lands and is moved into a docked position where it can be secured. The docking station allows an airship to land with reduced or eliminated risk of damage to the airship, payload or ground personnel injury compared to current methods in use. The docking station and method thus ensure more consistent wind conditions adjacent the docking station. Protection from buffeting by gusting winds also facilitates automated or semi-automated airship landing with fewer or no ground personnel.

8 Claims, 4 Drawing Sheets

AIRSHIP DOCKING STATION

FIELD OF THE INVENTION

The present invention pertains generally to the field of lighter-than-air airships, and more particularly to an improved docking station for such airships and a method that facilitates docking airships during periods of gusting winds and turbulence.

BACKGROUND OF THE INVENTION

Airships, which in the context of this invention includes any airship, aerostat, dirigible, blimp, or other lighter-than-air vehicle, generally owe their buoyancy to inflatable bladders containing a material that is lighter than air—pressurized helium or hydrogen gas, for example. Some airships include a power source for independent travel, and others are connected to the ground through a tether, such as for the purposes of surveillance or marketing. Airships typically have an aerodynamic shape to weathervane to face into the wind and to minimize wind-generated drag forces.

Although some airships can remain aloft for a long time, airships typically need to return to the ground periodically—to avoid severe weather conditions, or for repair and scheduled maintenance of either the airship or payload equipment carried by the airship, such as radar and electro-optical sensors. Landing/docking an airship typically requires 10-15 people on the ground to stabilize the airship and prevent damage to its skin or payload until it is secured. This landing process can be risky to technical payloads and dangerous to ground personnel during times of gusty winds and turbulence. Recent U.S. military experience with tethered airships has shown a frequent occurrence of either damage to a critical sensor from a ground strike or loss of the entire airship due to a broken cable. At times over the past 10 years the loss of an airship occurred at an average rate of once per month, thus reducing the situational awareness of potential threats in the area.

SUMMARY OF THE INVENTION

The present invention provides an airship docking station with one or more sources of relatively high speed airflow to facilitate landing an airship in turbulent or gusting air conditions. The sources of airflow are arranged to produce an envelope of laminar airflow over the surface of the airship to stabilize the airship as it maneuvers into a docked position where it can be secured by ground personnel and the docking station. The modified docking station provided by the invention facilitates retrieving an airship while mitigating the risk of airship or payload damage, and mitigating the risk of injury to ground personnel faced with catching guide ropes on a buffeting airship with a reduced ground crew (i.e. reducing cost), compared to the current docking systems in use today. The modified docking station also facilitates automated or semi-automated airship landing with fewer or no ground personnel.

The present invention also provides a method of using a docking station with sources of airflow to help an airship land at the docking station. The method includes the steps of activating one or more relatively lower sources of airflow; and activating one or more relatively higher sources of airflow spaced from the lower sources of airflow. The step of activating the relatively higher sources of airflow occurs after the airship is brought near airflow generated by the lower sources of airflow.

Further features of the invention will become apparent from the following detailed description when considered in conjunction with the drawings.

DETAILED DESCRIPTION

Figure 1:
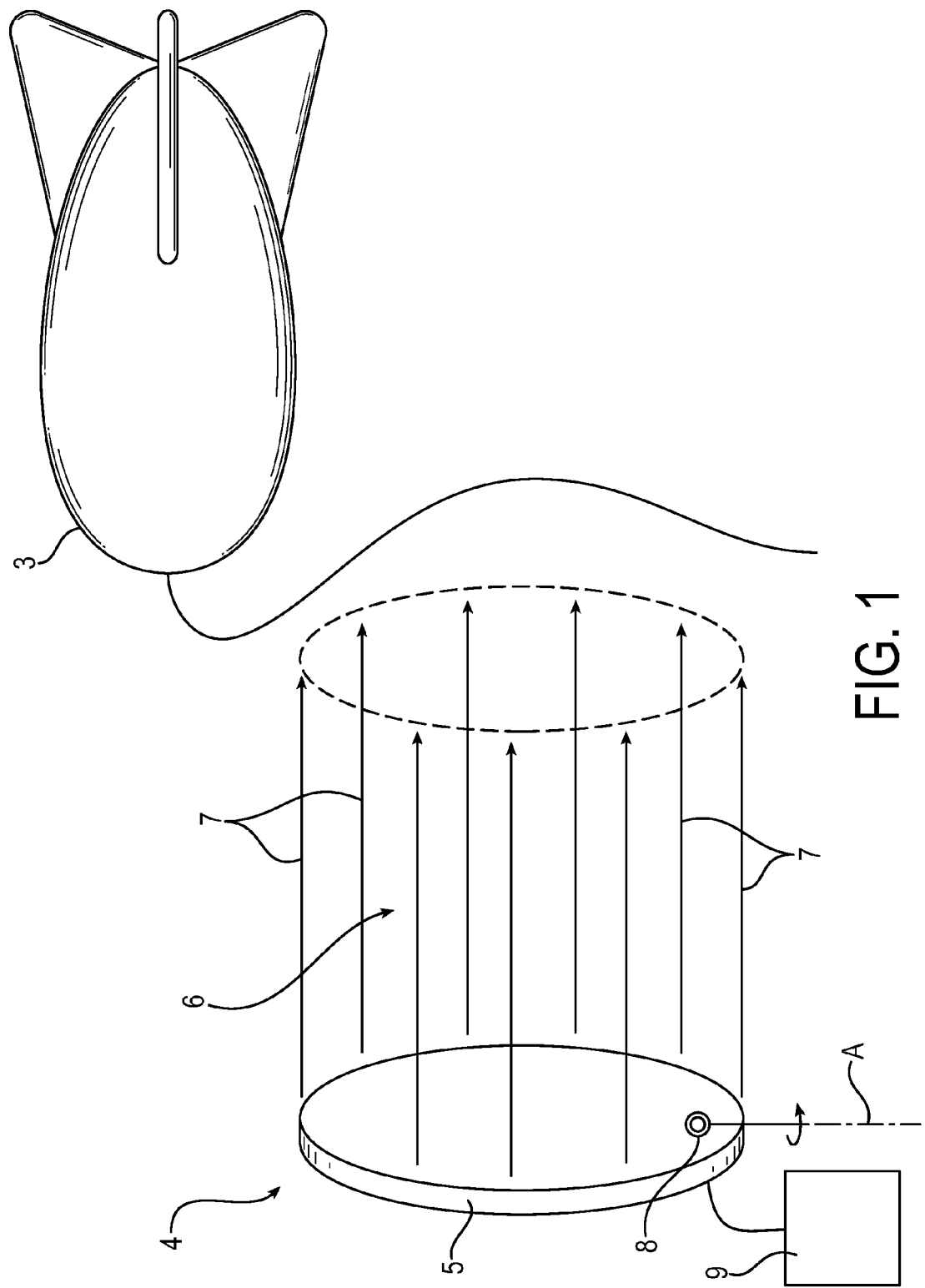
FIG. 1 is a schematic illustration of a docking station provided by the present invention.

Airships are deployed in a variety of locations, some of which may have less than ideal wind conditions. The present invention provides an envelope of laminar airflow that facilitates docking an airship in difficult wind conditions. Due to their increasingly critical role, it is important that airships can be deployed and recalled safely even in harsh, windy environments. Strong winds and wind gusts are most problematic for deployment and recovery of an airship. When it comes to controlling lighter-than-air structures within the atmosphere, air movement is one of the major concerns. Unstable conditions caused by turbulent wind gusts make it difficult to dock airships, and an airship buffeted by gusting winds from inconsistent directions and with inconsistent force can lead to damage or injury to the airship, its cargo, or ground personnel, all of which can hinder or prevent further use of the airship. These problems can be minimized by attempting to land airships before unstable conditions arise. Unfortunately, the time required to land an airship can be greater than the time within which such unstable conditions can be forecast. Moreover, airships often need to remain aloft even when unstable conditions are forecast.

Wind speed also varies with height and terrain. Wind gust intensity generally is higher near the ground. In open areas, the gust intensity is typically about 25% of the local wind speed, which is a relatively low turbulence level. In high wind conditions, however, gust intensity can be a significant problem. In contrast, in urban areas the local wind speeds are comparatively low, but in the vicinity of buildings the turbulence intensity can be about 3 to 5 times the local wind speed. Similar conditions can occur at sea around the superstructure of large naval vessels.

The inherent instability of a gusty wind environment is a significant problem for the launching and recovery of airships. In strong gusts, the airship tends to sway and turn uncontrollably. This erratic behavior makes it difficult and dangerous for site personnel to handle the airship and secure it in a docking station.

The present invention provides a protected zone or volume adjacent a docking station that is bounded by airflow that is relatively high, that is it has sufficient velocity to minimize the forces generated by wind gusts, shielding the protective zone from most or all of the wind gust forces. Thus the present invention provides a protected zone that is calmer than the surrounding air, a refuge from turbulent or gusting wind. This protected zone makes it easier to draw an airship in to a docking station and makes it easier to secure the airship in place with fewer ground personnel.

More particularly, the present invention provides an airship docking station with one or more sources of relatively high speed airflow to facilitate landing an airship in turbulent or gusting air conditions. The sources of airflow are arranged to produce an envelope of laminar airflow over the surface of the airship to stabilize the airship as it transitions from altitude (typically several thousand feet) and maneuvers into a docked position where it can be secured by ground personnel and the docking station. The docking station provided by the invention makes it easier to retrieve an airship while mitigating the risk of airship or payload damage, and mitigating the risk of injury to ground personnel faced with catching guide ropes on a buffeting airship with a reduced ground crew (i.e. reducing cost), in comparison to the docking systems currently in use. The docking station and method provided by the present invention thus ensure more consistent wind conditions adjacent the docking station. Protection from buffeting by gusting winds also facilitates automated or semi-automated airship landing with fewer ground personnel.

The required source of airflow can be provided by industrial fans. A fan-based system is very simple. There are many different potential configurations, and fans are easy to maintain and fix when something breaks. Industrial fans range from about 2,000 CFM (about 0.9 $m^3$/sec) to 75,000 CFM (about 35 $m^3$/sec). These fans can produce a sufficiently a large volume of airflow to provide a protected volume big enough to receive an airship. We estimate that about three 75,000 CFM (about 35 $m^3$/sec) fans would provide sufficient airflow to stabilize the airship. The largest negative associated with this approach is the overall size of the fans. 75,000 CFM (about 35 $m^3$/sec) fans typically are each about 5 feet (about 1.5 m) in diameter and would require a stand. This airflow can be subdivided among an array of smaller fans to provide a sufficient stabilization zone or volume, and using more fans also would allow more control over the airflow.

While the array of fans can provide adequate airflow, moving and setting up the fans can be a challenge. The fans also require a large generator or power source nearby. Each of the big fans generally requires a 230 or 460-volt power source. In addition they can be very loud. Some 75,000 CFM (about 35 $m^3$/sec) fans can produce 84 decibels of noise at a distance of 5 feet (about 1.5 m), and users might require hearing protection.

Another method of generating airflow is to use ducted fans instead of open fans. While either an open fan or a ducted fan can generate the airflow needed to help keep the airship stabilized, ducted fans and open fans have different relative advantages and disadvantages. The ducted fan, for example, often is more efficient than an open fan. As a result, smaller diameter ducted fans can generate the same amount of airflow as larger diameter open fans. The ducting around the propellers also helps to reduce noise. Ducted fans also do a better job of directing the airflow exiting the fan. And the ducting helps to protect the motor, propeller and other moving parts from harsh environmental elements such as dust and sand. While an open fan also can have dust covers, dust covers tend to adversely affect an open fan's performance.

Ducted fans can have some disadvantages relative to open fans, however. Good efficiency requires very small clearances between the blade tips and the ducting. This often means that ducted fans will be more expensive than an open fan. The close clearances also may be a problem in harsh environments as debris can reduce the efficiency or even cause problems with the operation of the fan. This small clearance also means that vibration needs to be minimized. Finally, while an open fan is a very simple and easy to use, it may require more maintenance over the service lifetime. In summary, relative to open fans ducted fans can lead to higher efficiencies, less noise and should require less maintenance, as long as the proper steps are taken to keep debris away from the ducts.

Another way to generate airflow is an air start cart typically used at airports and military airfields to provide a high volume of air to help large jet engines start. Most start carts generate between 2.5 to 7 lbs/s (between about 1.1 to 3.1 kg/s) of airflow. The airflow from a start cart is easily delivered wherever it is needed through a hose or other ductwork. In that these start carts are already in use, there are significant benefits of using a start cart for the airflow source air.

The present invention also can take advantage of the Coanda Effect to make it easier to dock an airship. The Coanda Effect can be seen in a jet of air that attaches to nearby surfaces. Normally a free jet would cause entrainment of the fluid through which it travels. This means that a jet of air can pull along additional airflow next to its path. When a jet comes close to a surface, however, the air between the jet and the surface resists entrainment, and the jet itself is attracted to the surface. In other words, a solid surface near a jet of air can change the path of the airflow jet. This effect can help to stabilize the airship because the airflow pulls the airship towards the airflow when the airship comes near it, but the airflow jet will push the airship away if the airship overshoots and enters the jet's airflow path.

The ring jet is a configuration that can surround the airship with a cylindrical Coanda airflow. The ring jet takes the form of a ring with multiple exhaust nozzles spaced around the ring or takes the form of an arc to define the envelope of airflow.

The Coanda flow is an attractive alternative because a smaller volume flow rate of air is required in comparison with the fan concept, for example. This jet would have a higher speed than the fan flow, but could potentially have lower power requirements to produce it.

A Coanda jet array uses the same concept as the ring jet to stabilize the airship, but would consist of several discrete jets oriented in a pattern which could have the same effect as a ring jet while requiring less air. The primary advantage of this configuration is a reduction in the total air requirement, but this must be balanced against the effectiveness in stabilizing the airship.

A second advantage of this configuration is that it could be used in a "pincer" type mode, in which the arms of the array are drawn together to further localize the airship as it is drawn to the dock.

Another way the Coanda Effect can be helpful for docking an airship is demonstrated by the following example. When low speed air is directed through a cone-shape diverging duct (an inverted funnel) and an object is inserted into the cone, a low-pressure region is formed between the object and the wall because the flow velocity increases over the object. The net force is described by Bernoulli's equation that says that as the velocity of the flow increases, the pressure drops. This can be simply demonstrated by inserting a ping-pong ball into a funnel, for example, and blowing air into the funnel through the small end. The airflow creates a low-pressure region in the funnel that draws the ball into and generally holds the ball in the funnel.

The effect can be quite strong for moderate flow rates. The airship must be in close proximity to the funnel, however, for the effect to work. Consequently the funnel concept may be most useful in close proximity to the airship, to hold it in position once it has been stabilized, for example.

Referring now to the drawings, and initially FIG. 1, which shows a schematic docking station 4 provided by the invention for docking an airship 3. The docking station 4 includes means 5 for providing a protected volume 6 bounded by an envelope of relatively high speed airflow indicated by arrows 7. The protected volume 6 is substantially cylindrical and lies adjacent a docking apparatus 8 to which the airship can be secured. The docking apparatus 8 and the means 6 for providing the protective volume 6 defined by the envelope 7 of relatively high speed airflow preferably are configured for rotation together about a relatively vertical axis A. In recovering an airship, the airship is drawn into that protected space 6, where the envelope 7 of relatively higher-speed air shelters the airship from gusting winds so that the airship can be held relatively steady as it is drawn into position and secured in to the docking apparatus 8. The docking station 4 further includes a controller 9 to control the means 5 for providing airflow. The controller 9 generally also controls rotation of the docking apparatus 8 relative to the prevailing wind direction.

Figure 2:
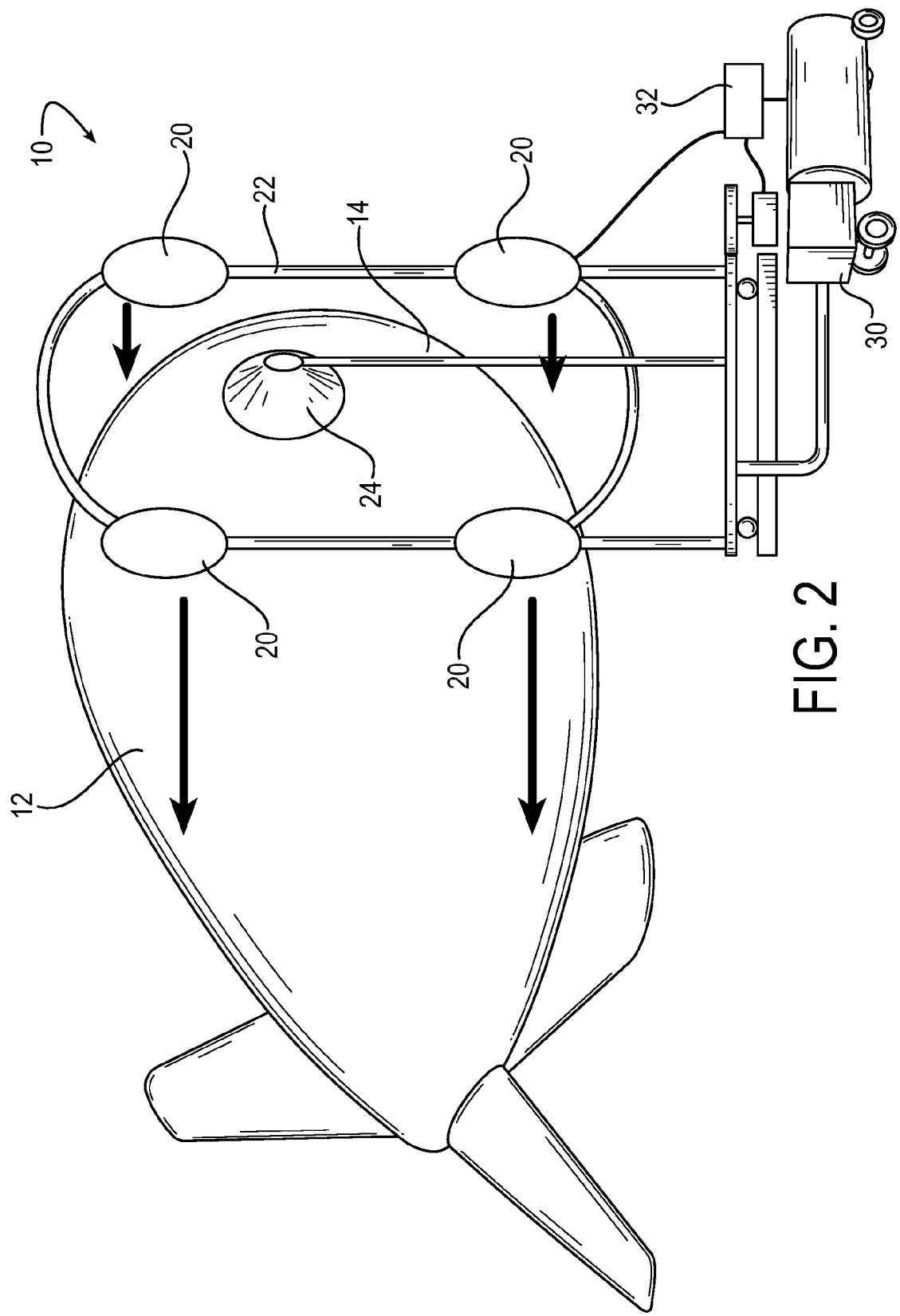
FIG. 2 is a perspective sketch of one embodiment of the present invention with an airship.

As shown in the exemplary embodiment of FIG. 2, the present invention provides a docking station 10 for an airship 12 that includes a docking apparatus 14 for securing a leading portion of the airship 12, and one or more sources of airflow 20 arranged adjacent the docking apparatus 14 to provide airflow over a respective portion of the airship 12.

Figure 3:
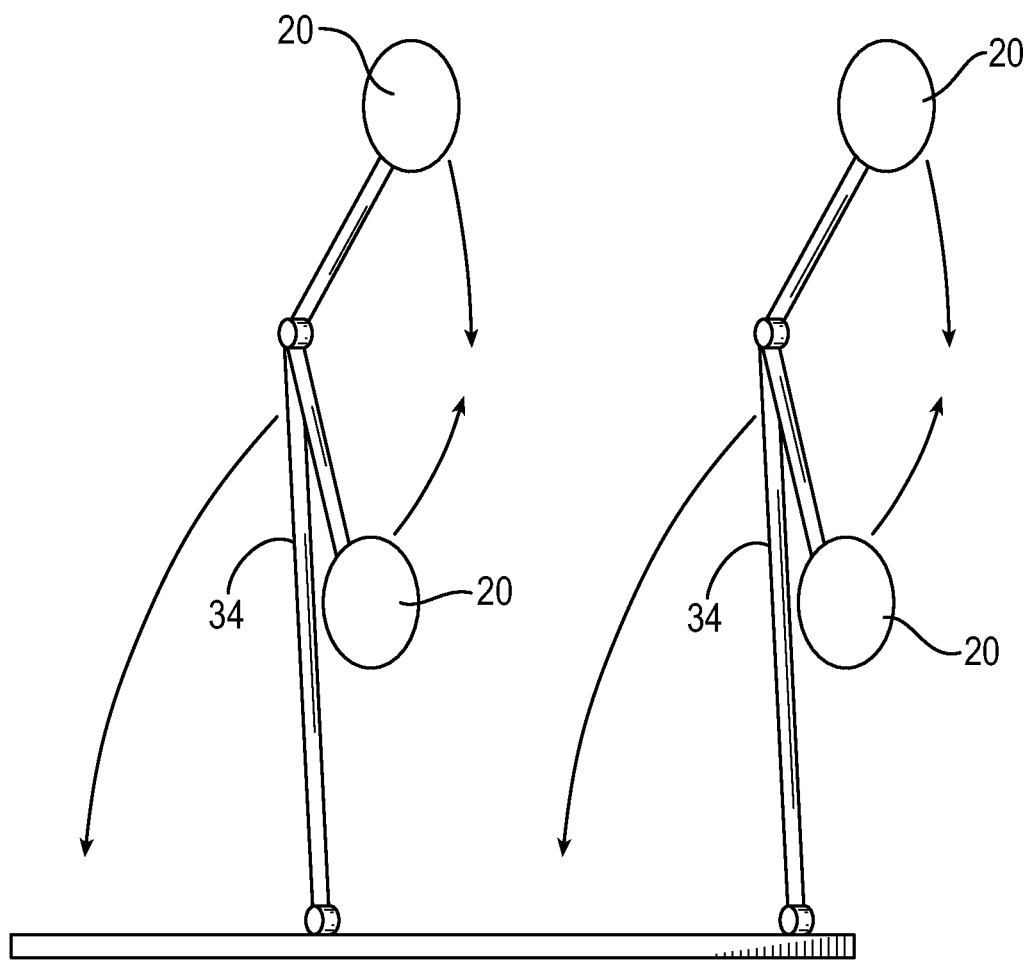
FIG. 3 is a perspective sketch of another embodiment of the present invention.

The docking apparatus 14 includes a frame 22 that is pivotable about a generally vertical axis, and a nose cone receiver 24 mounted to the frame 22 for receipt of a nose portion at a leading end of the airship 10. The pivoting nature of the frame 22 allows the docking apparatus 14 to rotate with respect to a prevailing wind direction so that the prevailing wind assists the sources of airflow. The sources of airflow 20 are connected to the frame 22 for pivotable movement with the frame 22. The frame 22 shown in FIG. 2 is rigid, exemplary of a permanent installation, whereas the frame 34 shown in FIG. 3 includes collapsible booms for elevating the sources of airflow 20. The collapsible frame 34 can be mounted on a vehicle or collapsed into a more compact configuration for storage or transport.

Figure 4:
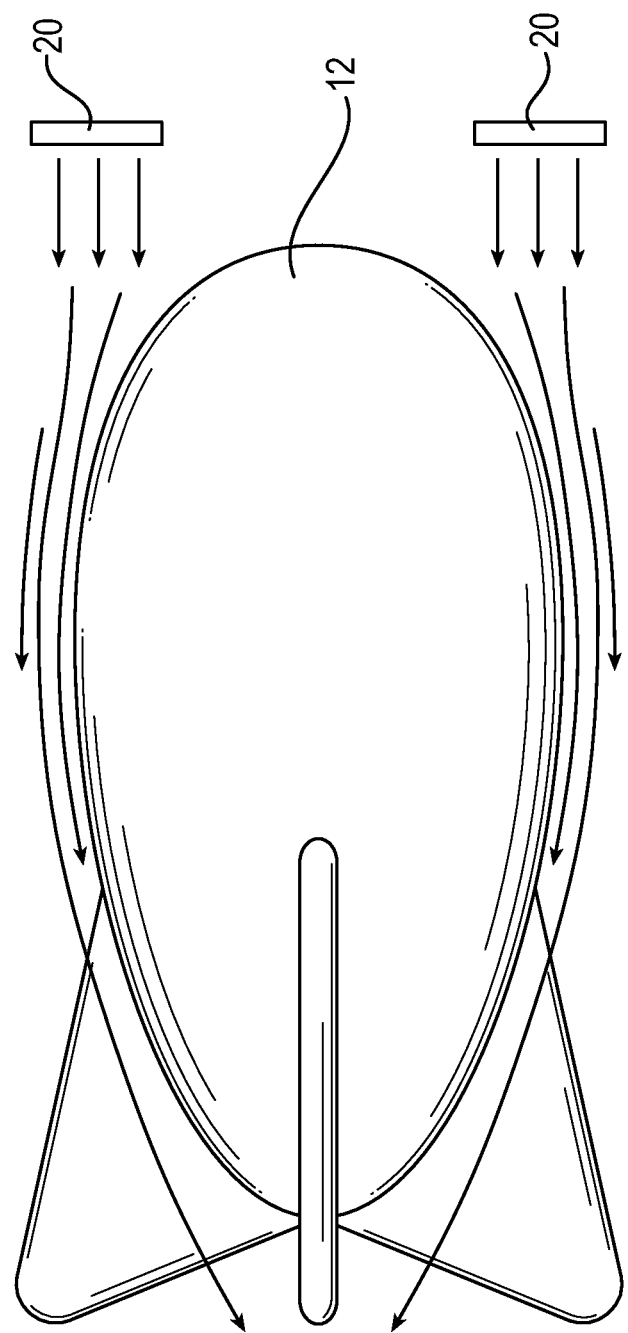
FIG. 4 is a schematic illustration of airflow from the docking station around an airship.

The sources of airflow 20 generally face in substantially the same direction. Induced airflow from the sources of airflow 20 is provided from the docking apparatus 14 toward the recovering airship 12, as shown by the arrows in FIGS. 2 and 4. In the illustrated embodiment, a plurality of spaced-apart sources of airflow 20 are provided, specifically four equally-spaced sources of airflow, corresponding to four circumferential quadrants of the airship, two upper sources and two lower sources. The airflow is ducted or otherwise directed to induce airflow over a volume sized to receive the airship, whereby airflow is directed over all four frontal quadrants when the airship is landing at the docking station.

The nose cone receiver 24 can provide an additional source of airflow that utilizes the Coanda Effect. The nose cone receiver 24 is directly in front of the center mass of the airship 12. By inducing airflow through a circular nozzle with vented ports, the Coanda Effect will draw the airship 12 to dock into the nose cone receiver 24 as the outer four quadrant airflow sources 20 work to stabilize the body of the airship 12 and minimize the pitch, roll and yaw reactions of the airship 12 to the gusting, turbulent conditions. In essence there are five sources of induced airflow; one 24 is centered on the nose of the airship 12 to assist drawing the body of the airship 12 to the docking station and four others, one 20 in each quadrant, providing stabilization support. Each source of airflow 20 and 24 can be controlled in volume and direction as the airship 12 is maneuvered into position at the docking station 10.

The landing of the airship 12 can be through motive power on the airship (typically ducted fans) or via a tether connected to the airship which typically is attached to a winch on the ground. Airships typically have a tether attached at the bottom third of the airship that is used to transport electrical power, data, and launch/recovery winching. Guide ropes (typically 3-5 per side) often hang from the sides of the airship and are used by the ground crew to capture and guide the airship into the docking station.

The sources of airflow include one or more of an airflow generator and one or more ducts that guide airflow from a generator, and additionally or alternatively one or more fans arranged to direct airflow over the airship. The source of airflow can be an individual fan, or a duct from a fan or compressor. High airflow electric fans or commercial aircraft start carts (30 in FIG. 2) are exemplary sources of airflow.

A controller 32 can be used to selectively control one or more of the sources of airflow and rotation of the frame 22. For example, the speed of the airflow, the direction of the airflow, and/or the volume of the airflow can be controlled by the controller. An exemplary controller typically includes a processor, such as a microprocessor, related memory and output devices, and corresponding software and means for communicating with the one or more sources of airflow. The controller can control the sources of airflow in accordance with the following method, for example.

The present invention also provides a method of docking an airship using a docking station with sources of airflow to help an airship land streamlined and secured at the docking station. An exemplary method includes the steps of activating one or more relatively lower-positioned sources of airflow; and activating one or more relatively higher sources of airflow spaced from the lower sources of airflow. Additionally, the method can include the steps of sensing and controlling two or more lower positioned (bottom two quadrants of the airship from a frontal view) sources of airflow; and sensing and controlling two or more higher positioned (top two quadrants of the airship from a frontal view) sources of airflow spaced one source per quadrant.

The step of activating the relatively higher sources of airflow occurs after the airship is brought near airflow generated by the lower sources of airflow. The lower sources of airflow can provide air at a rate suitable to stabilize lateral movements of the airship. When the centerline of the airship falls below the height of the upper sources of airflow, the flow of air from the upper sources of airflow is activated or increased to a rate suitable to stabilize the vertical movements of the airship. At this point the airship is within an envelope of airflow induced by the upper and lower sources and is sufficiently stabilized that the airship is more easily secured.

Airflow may be induced at the leading end of the airship alone, at locations spaced along the length or circumference of the airship, or over aerodynamic control surfaces removed from the leading end of the airship, or combinations thereof. The direction of each source of airflow can be controlled, as well as the speed of the airflow, in conjunction with the relative position of the airship as it is moved into a docking position.

In summary, the present invention provides an airship docking station that includes one or more sources of relatively high speed airflow to facilitate effectively recovering an airship in turbulent or gusting air conditions. The sources of airflow are arranged to produce an envelope of airflow over the surface of the airship to stabilize the airship as it lands and is moved into a docked position where it can be secured. The docking station allows an airship to land with reduced risk of damage to the airship and its payload, or ground personnel injury compared to current methods. The docking station and method thus ensure more consistent wind conditions adjacent the docking station. Protection from buffeting by gusting winds also facilitates automated or semi-automated airship landing with fewer or no ground personnel.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A docking station for an airship, comprising: a docking apparatus for securing a leading portion of the airship; and
one or more sources of airflow arranged adjacent the docking apparatus to provide airflow that bounds a volume sized to receive a portion of the airship;
where the docking apparatus includes a frame that is pivotable about a generally vertical axis, and the sources of airflow are connected to the frame for pivotable movement with the frame.

2. A docking station as set forth in claim 1, where the sources of airflow include an airflow generator and one or more ducts that guide the airflow from the generator, and one or more fans arranged to direct the airflow.

3. A docking station as set forth in claim 1, comprising a plurality of spaced-apart sources of airflow.

4. A docking station as set forth in claim 3, where the plurality of sources of airflow are circumferentially spaced.

5. A docking station as set forth in claim 1, where the sources of airflow are configured to direct airflow in substantially the same direction.

6. A docking station as set forth in claim 1, comprising a controller that selectively controls one or more of the sources of airflow.

7. A docking station as set forth in claim 6, where the controller controls at least one of the speed of the airflow at each source of airflow, the volume of airflow, and the direction of the airflow.

8. A method of docking an airship at a docking apparatus, comprising the steps of:
activating one or more relatively lower sources of airflow arranged adjacent the docking apparatus; and activating one or more relatively higher sources of airflow arranged adjacent the docking apparatus spaced from the lower sources of airflow, the step of activating the relatively higher sources of airflow occurring after the airship is brought near airflow generated by the lower sources of airflow.

* * * * *